(12) United States Patent
Poncher

(10) Patent No.: US 11,282,029 B2
(45) Date of Patent: *Mar. 22, 2022

(54) INTELLIGENT PART NUMBERING SYSTEM AND METHOD

(71) Applicant: Kenneth Ian Poncher, Deerfield, IL (US)

(72) Inventor: Kenneth Ian Poncher, Deerfield, IL (US)

(*) Notice: Subject to any disclaimer, the term of this patent is extended or adjusted under 35 U.S.C. 154(b) by 374 days.

This patent is subject to a terminal disclaimer.

(21) Appl. No.: 16/506,061

(22) Filed: Jul. 9, 2019

(65) Prior Publication Data

US 2020/0005232 A1 Jan. 2, 2020

Related U.S. Application Data

(63) Continuation of application No. 14/836,674, filed on Aug. 26, 2015, now Pat. No. 10,387,827.

(60) Provisional application No. 62/043,304, filed on Aug. 28, 2014.

(51) Int. Cl.
*G06Q 10/08* (2012.01)
*G06F 16/25* (2019.01)

(52) U.S. Cl.
CPC .......... *G06Q 10/087* (2013.01); *G06F 16/25* (2019.01); *Y10S 707/948* (2013.01); *Y10S 707/99948* (2013.01)

(58) Field of Classification Search
None
See application file for complete search history.

(56) References Cited

U.S. PATENT DOCUMENTS

| | | | |
|---|---|---|---|
| 6,173,210 B1 | 1/2001 | Bjornson et al. | |
| 7,680,704 B2* | 3/2010 | Ouchi | G06Q 10/087 |
| | | | 705/27.1 |
| 2007/0100842 A1* | 5/2007 | Wykes | G06Q 30/0603 |

OTHER PUBLICATIONS

Unknown, "See How does Database Indexing work," Aug. 2008, available at https://stackoverflow.com/questions/1108/how-does-database-indexing-work).

* cited by examiner

*Primary Examiner* — Allen C Chein
(74) *Attorney, Agent, or Firm* — Scheinberg & Associates, PC; Michael Scheinberg; John Kelly

(57) ABSTRACT

A database design and associated support tools for storing Intelligent Part Numbering System (IPNS) metadata for the purpose of interfacing with information systems in a more efficient way, thereby reducing maintenance requirement and improving information technology (IT) searching options. Embodiments of the present invention are directed to a method, system, and computer-readable medium for storing one or more attributes of a part number family in a database as metadata. The method includes associating a part number code with each attribute in the database; receiving one or more user inputs, each user input indicating a selection of one of the attributes; determining the part number codes associated with each of the selected attributes; and generating a part number based on the part number codes associated with each of the selected attributes.

21 Claims, 5 Drawing Sheets

| Mfg | AMPH | Amphenol | | | |
|---|---|---|---|---|---|
| Series | D38999 | | | | |
| Series-Attr | Sealing | TV Mil DTL-38999 Series III Connectors offer High density contact | | | |
| Series-Attr | Mating Life | Sealed against sand and dust per Mil-std-202 & Ice resistance | | | |
| Series-Attr | Chemical Resistance | 500 Cycle Minimum with 1500 cycle as an option | | | |
| Series-Attr | Approvals | Lubricating oils, hydraulic Fluids, Coolants, Deicing Fluids per M | | | |
| Series-Attr | Operation Temperature | MIL-DTL-38999 | | | |
| Series-Attr | | -55C to 85C | | | |
| Long-Desc | | :1: Mini Toggle Switch with :2: Actuator and :3: Bushing, :4: Terminals with .5: Conta | | | |

| PN Defining Attributes | Shell Style | Finish | Layout | Contact | Rotation | Modifier |
|---|---|---|---|---|---|---|
| Option-1 | 20:Wall Mount Receptac | F:Electroless Nickel | A:35.6x22D | P:Pins | N:Normal (Std:Standard |
| Option-2 | 24:Jam Nut Receptacle | K:Stainless Steel | A:98:3x20 | S:Sockets | A:Alternate | -LC:Less C |
| Option-3 | 26:Straight Cable Plug | W:Olive Drab | B:22x16 | H:Pins 1500 | B:Limited |
| Option-4 | 21:Box Mount Hermetics | C:Anodized | B:5.5x20 | J:Sockets 150 | C:Alternate(C) |
| Option-5 | 23:Jam Nut Hermetics | S:SS Electroless Nic | B:35:13x22D | A:Less Pins | D:Alternate(D) |

| Co-Dependent Attributes | Service Rating | # of Contacts | Shell Size | # of 22D Contacts | # of Size 20 Contact | Salt Spray2 | Operating Temperature | Material-Shell2 |
|---|---|---|---|---|---|---|---|---|
| Option-1 | M | 6 | A | | | 48 Hours per MIL-STI | -65c to 200c | Electroless |
| Option-2 | I | 3 | A | 35 | 3 | 2000 Hours per MIL-S | -65c to 200c | Conductive |
| Option-3 | I | 2 | B | | | 500 Hours per MIL-S | -65c to 175c | Olive drab |
| Option-4 | I | 6 | B | | 6 | | | |
| Option-5 | M | 13 | B | 13 | | | | |

INTELLIGENT PART NUMBERING SYSTEM AND METHOD

The present application is a continuation of U.S. patent application Ser. No. 14/836,674, filed on Aug. 26, 2015, which claims benefit of provisional U.S. Patent Application No. 62/043,304, filed on Aug. 28, 2014. The subject matter disclosed therein is incorporated by reference in the present application.

TECHNICAL FIELD OF THE INVENTION

The present invention relates generally to database design and more particularly to a database design and associated support tools for generating and storing part numbers using metadata.

BACKGROUND OF THE INVENTION

Part numbering systems are used to uniquely identify a specific instance of a product or good. Families of goods, which are sometimes called a series, have some common attributes (series-based attributes) and some unique attributes that can be varied. A family of goods can be described by listing, in lists or tables on a family/series specification sheet, each attribute options for the family of goods. Such attributes and associated options may include attributes (e.g., size, color, and style), and the associated options (e.g. small, medium, or large; red, white, or blue; long, short, or mid). The owner of the family/series will assign a code to each option and define a specific order in which these codes are concatenated along with a predefined set of character prefixes and suffixes to uniquely identify all the attributes of an individual item. This unique identifier within a product family is referenced by many names including, but not limited to, Item Number, Part Number, Stock Keeping Unit (SKU), Catalog Number, Part ID, and the like. This method can be decoded at point of use by persons who are familiar with the family owner's specification practices. In the prior art, parts catalogs would typically include the codes for each option in a family or series. A purchaser, such as an engineer or technician, would try to identify the family/series of the part needed for a particular project in the catalog, and then construct a part number from the option codes listed for the family/series of the part. This part number would then be used to order the part from the distributer or manufacturer.

Prior art information systems are disconnected from this method of part numbering systems because the information systems require a unique character string or part numbers which are indexed in a database with the whole part number as an indexed key or part of a compound index. Prior art information systems store linked information (attributes) back to a single instance of a part number. This is in part due to the fact that enterprise resource planning (ERP) systems require a unique character string part number for each part number. ERP systems are used by businesses to collect, store, manage and interpret data from many business activities such as product planning, cost and development; manufacturing or service delivery; marketing and sales; inventory management; and shipping and payment. ERP provides an integrated view of core business processes, often in real-time, using common databases maintained by a database management system. A part numbering system needs to be able to provide a part number than can be automatically recognized by an ERP system.

When a purchaser uses a prior art information system, such as an online parts website, to find and order a part, the information system searches through the entire database of indexed part numbers to find matching part numbers. Because of all of the possible combinations of options for a series of parts, there can be millions of possible part number instances (in some cases billions or even trillions). As a result, online parts distributors typically only include 5% to 10% of the possible part number instances in their online database, for example, by including top selling items only. For an engineer or purchaser who needs a specialty part, the part number may not be available from the distributor's information system. In addition, offering a new part series for sale can involve several weeks of coding and data entry to make the new part series available to customers via the distributor's existing online information system, representing a significant cost to the distributor.

What is needed in the art is a database design and associated tools that allow information systems to store and maintain product family/series information in metadata form without the hierarchical and full indexed list of part numbers. Such a system would allow for rapid storage and retrieval of attributes and co-dependent attributes for a part number that may or may not be pre-loaded into an information system.

SUMMARY OF THE INVENTION

Embodiments of the present invention are directed to a method, system, and computer-readable medium for storing one or more attributes of a part number family in a database as metadata. The method includes associating a part number code with each attribute in the database; receiving one or more user inputs, each user input indicating a selection of one of the attributes; determining the part number codes associated with each of the selected attributes; and generating a part number based on the part number codes associated with each of the selected attributes.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which:

FIG. 2 is the data extracted from a family specification data sheet showing the various options available in an exemplary family or series of a part;

FIG. 4 shows an exemplary user interface for embodiments of the present invention.

DETAILED DESCRIPTION OF PREFERRED EMBODIMENTS

The database design and associated tools in accordance with embodiments of the present invention enable information systems to store and maintain product family information in metadata form without a hierarchical and full indexed list of part numbers. Embodiments of the present invention enables rapid storage and retrieval of attributes and codependent attributes for a part number that may or may not be pre-loaded into an information system. The commercial benefits include a reduction in storage and maintenance requirements for their use or commercial promotion of a family of products. Embodiments of the present invention are built to work with existing IT systems and provide enhancement capability to existing IT solutions. Embodiments of the present invention have no limits to the number of attributes that can be concatenated, the options that can be associated with an attribute, the series that can be stored, the series owners that can be stored, and the product groups that can be represented.

Figure 1:
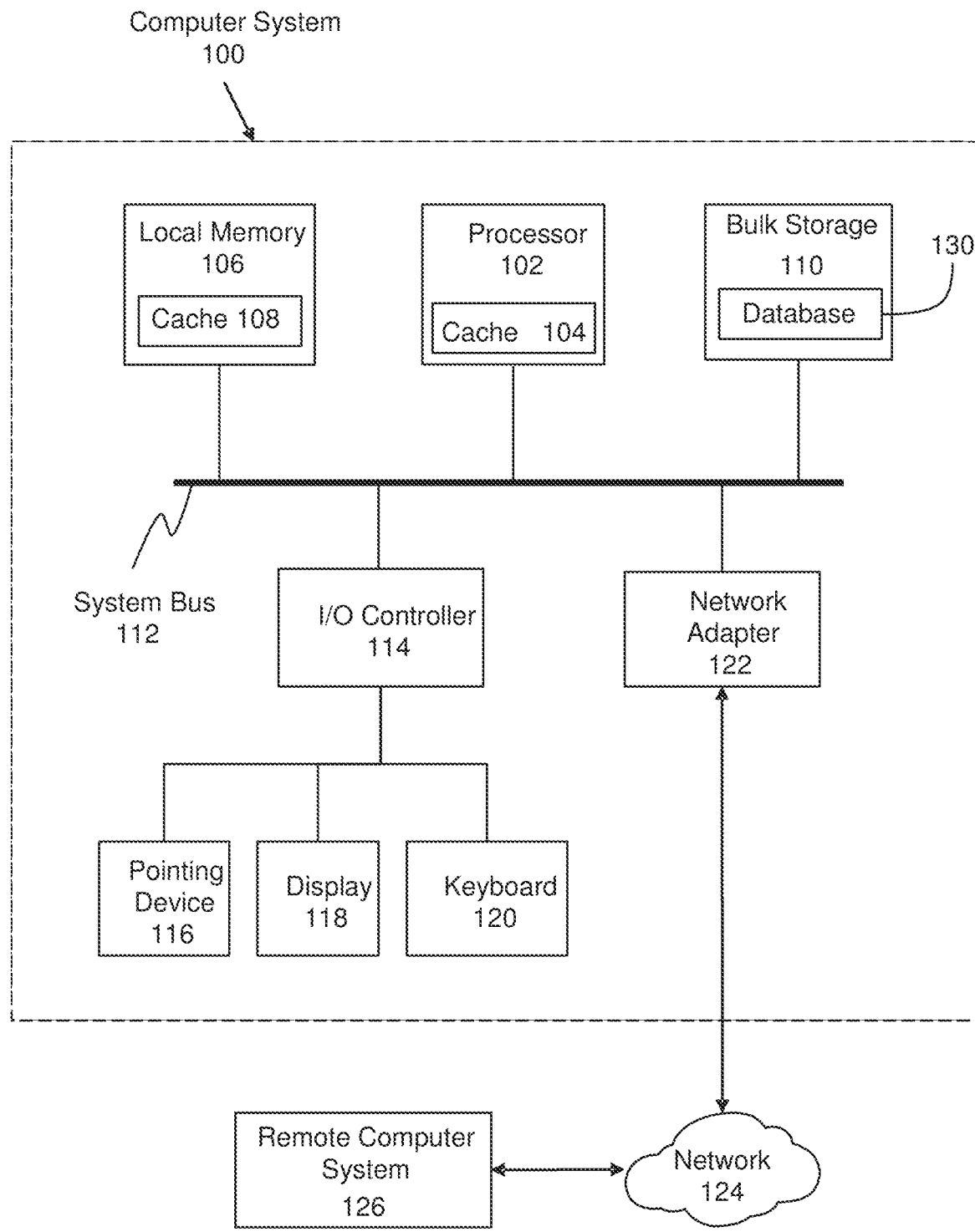
FIG. 1 shows a block diagram is shown of computer system 100 suitable for storing and/or executing a computer program product in accordance with embodiments of the present invention.

FIG. 1 shows a block diagram is shown of computer system 100 suitable for storing and/or executing a computer program product in accordance with embodiments of the present invention. Computer system 100 includes at least one processor 102 coupled directly or indirectly to memory elements through system bus 112. The memory elements comprise a tangible, non-transitory, computer-readable medium and can include local memory 106 employed during the actual execution of the program code, bulk storage 110, and cache memories 104 and 108 which provide temporary storage of at least some program code in order to reduce the number of times code must be retrieved from bulk storage 110 during execution. Bulk storage 110, while shown as part of computer system 100, can also include remote bulk storage, also known as cloud storage, which provides remote storage accessible via network adapter 122 and network 124. Input/output or I/O devices (including but not limited to keyboards 120, displays 118, pointing devices 116, etc.) can be coupled to the system either directly or through intervening I/O controllers 114. Network adapters 122 may also be coupled to computer system 100 to enable the system to become coupled to remote computer system 126 or remote printers or storage devices through intervening private or public networks 124. Modems, cable modems, Ethernet cards, and wireless network adapters (e.g., WiFi, Bluetooth, cellular) are just a few exemplary types of network adapters. Persons of ordinary skill in the art would understand that computer system 100 can be embodied in a variety of ways within the scope of the present invention including, but not limited to, a microcomputer, a smartphone, a tablet computer, a file server, a mainframe computer system, or a partition on a virtual server in a cloud computing context.

FIG. 2 is the data extracted from a family specification data sheet showing the various options available in an exemplary family or series of a part. The manufacturer (Mfg) of the part is Amphenol (AMPH). The series of the part is D38999. Each series can include series attributes, part number (PN) defining attributes (Part Number Sections), and codependent attributes. Series attributes are attributes that are shared among all parts in the series.

Part number defining attributes (Part Number Sections) are attributes that define a specific instance of a part according to the options that are available for a series of parts. For a particular part number instance, only one value can be selected for part number defining attribute. As shown in the example of FIG. 2, one part number defining attribute is shell style. The shell style options that are available for an instance of a part are: wall mount receptacle, jam nut receptacle, straight cable plug, box mount hermetics, and jam nut hermetics. Each of these shell style options is associated with a part number code that is used to define the part number having a particular shell style. The wall mount receptacle shell style has the part number code 20, the jam nut receptacle shell style has the part number code 24, the straight cable plug shell style has the part number code 26, and so on. An instance of the series D38999 part having a wall mount receptacle shell style will include 20 in the position of the part number that corresponds to shell style option, giving a part number D38999/20. An instance of the series D38999 part having a jam nut receptacle shell style will include 24 in the position of the part number that corresponds to shell style option, giving a part number D38999/24. An instance of the series D38999 part having a straight cable plug shell style will include 26 in the position of the part number that corresponds to shell style option, giving a part number D38999/26.

Codepedent attributes are attributes that depend on the selection of a part number defining attribute. Some codependent attributes require the selection of a particular part number defining attribute. Some codependent attributes are unavailable for a part instance based upon the selection of a particular part number defining attribute. For example, Product Life Cycle is an attribute that is dependent on what Contact Style option is selected. The "P-Pins" contact style has a product life cycle of 500 mates. The "S-Sockets" contact style has a product life cycle of 500 mates. The "H-Pins (1500)" contact style has a product life cycle of 1500 mates. The "J-Sockets" contact style has a product life cycle of 1500 mates. The end user does not specifically select an option code for a codependent attribute. The end user's choices or part number attributes does dictate the codependent attribute value. Another example would be fuel efficiency in miles per gallon (MPG) for automobile selections. Users select the Engine Type/Style (4 Cylinder, 6 Cylinder, 8 Cylinder, Eco. . . . Turbo). Each Engine Option has a codependent MPG Attribute that is associated with the selection of the primary attribute that is part of the Part Numbering System. Prior art information systems require a unique character string or part numbers which are indexed in a database with that whole part number as an indexed key or part of a compound index. Prior art information systems store attributes back to a single instance of a part number.

Figure 3:
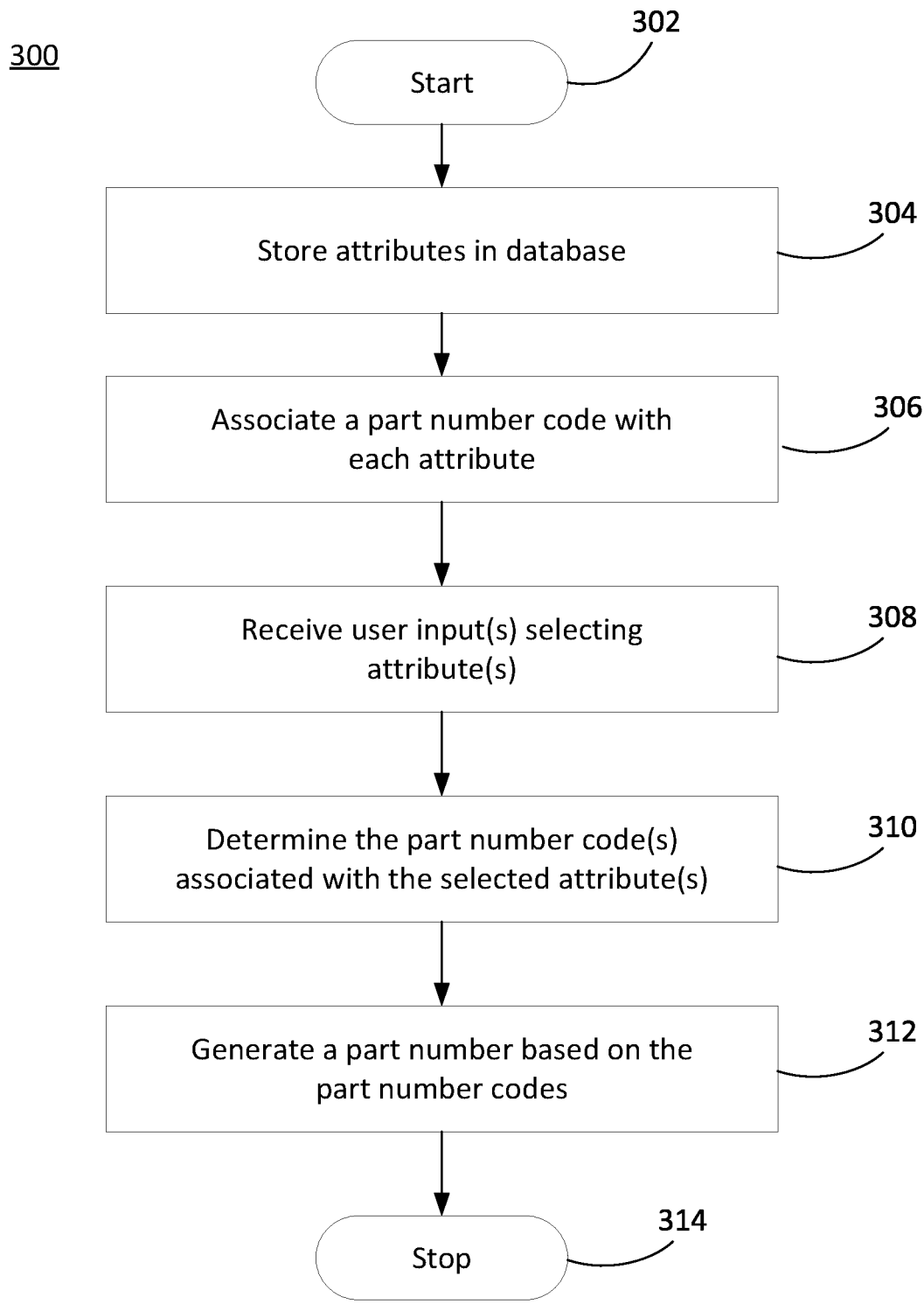
FIG. 3 is a flowchart showing a method for an intelligent part numbering system in accordance with embodiments of the present invention.

FIG. 3 is a flowchart showing a method for an intelligent part numbering system in accordance with embodiments of the present invention. The method is a computer-implemented method preferably embodied in a computer system such as exemplary computer system 100. The method is preferably embodied as computer-executable instructions encoded on a non-transitory, computer-readable medium, such as local memory 106 or bulk storage 110. The computer-executable instructions, when executed by processor 103, cause computer system 100 to perform the following steps.

The method begins at step 302. At step 304, attributes of a part number are stored in a database, such as database 130. Database 130 can be any database known in the art for storing data, including but not limited to structured query language (SQL) or Microsoft Access. The attributes are stored as metadata. That is, the attributes stored in the database describe the data comprising part numbers for a series of parts.

At step 304, each attribute stored in step 302 is associated with a part number code. The part number code is a symbol or text string that can be used to identify the attribute in a part number. Information regarding the position of the part number code in a part number is preferably associated with the attribute. The data can be entered manually by a user or imported automatically from an existing data store. For example, using the example shown in FIG. 2, shell style is part number defining attribute associated with part number series D38999. One option for the attribute is the wall mount receptacle shell style. The wall mount receptacle style is associated with part number code 20. In addition, the shell style part codes comprise the two digits following the series code. This information is also recorded in database 130.

At step 308, computer system 100 receives one or more user inputs, each user input indicating a selection of one of the attributes. The user input can be received from a customer or purchaser. The user input can be received from an owner or distributor of the parts who is taking an order from a customer or purchaser. In a preferred embodiment, computer system 100 receives the user input from remote computer system 126 via network 124, for example, in a hypertext transfer protocol (http) transaction over the World Wide Web (www). In this way, a customer, engineer, or purchaser can select attributes of a part number series in a familiar manner using a web browser application, such as Microsoft Internet Explorer, Google Chrome, Mozilla Firebox, Apple Safari, or the like.

At step 310, computer system 100 determines the part number codes associated with each of the selected attributes. Computer system 100 looks up the selected attributes in database 130 and identifies the part number codes associated with each of the selected attributes. For example, if the user input indicates a selection of wall mount receptacle for the shell style, then the computer system will determine from the metadata in the database 130 that the wall mount receptacle shell style has a part number code of 20. The computer can also determine product availability based on attribute selection. The computer can also determine which part number section options are valid and invalid based on a set of rules.

At step 312, computer system 100 generates a part number based on the part number codes associated with each of the selected attributes. Using the part number codes determined in step 310 and the information regarding the positions of the part number codes within the part number, computer system 100 generates a part number for the instance of the part having the attributes selected by the user. For example, computer system 100 receives user inputs indicating the following attribute selections for a part in series D38999: wall mount receptacle shell style (part number code 20), anodized aluminum finish (part number code C), 3×20 layout (part number code A98), pins contact (part number code P), and normal rotation (part number code N). Computer system 100, using the metadata stored in database 130, generates the following part number: D38999/20CA98PN. The generated part number can be transmitted to the user, preferably by being displayed to the user. The generated part number can be automatically entered into an electronic commerce system so the user can place an order. The generated part number can be automatically entered into an ERP system upon entry of the order so that fullfillment of the order can commence. The method stops at step 314.

Figure 4:
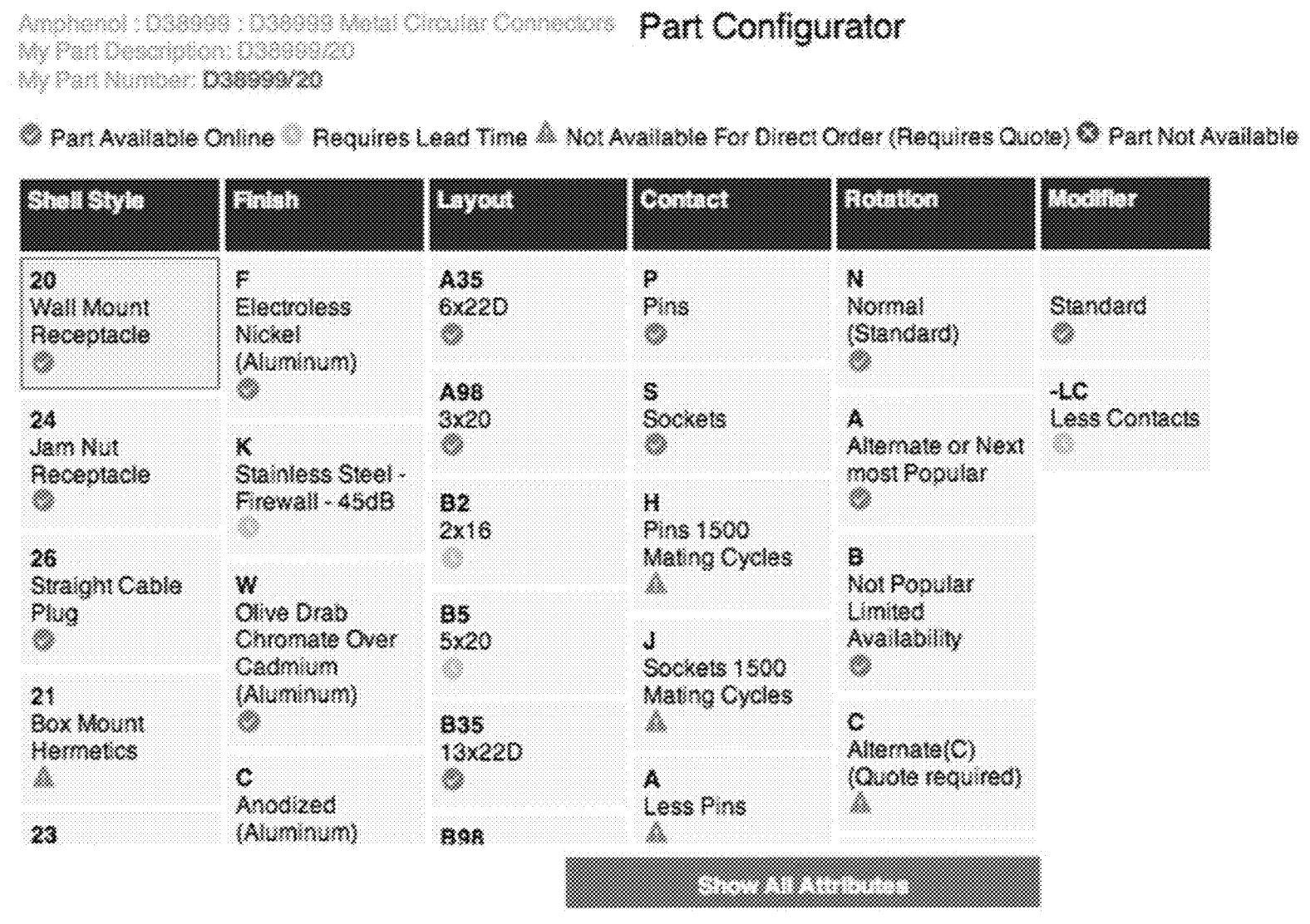

FIG. 4 shows an exemplary user interface for embodiments of the present invention. The user interface shown in FIG. 4 can be implemented as a web page viewable in a web browser application using in a well-known methods. The user navigates to the web page displaying the part configurator for the part series in which the user is interested. In the example of FIG. 4, the user has navigated to the part configurator for the Amphenol D38999 series of parts. The attributes are shown in tabular form as user-selectable cells. In the example shown in FIG. 4, the user has selected the wall mount receptable shell style having part number code 20. The selection is indicated by the square outline around the cell for the wall mount receptable shell style attribute. The part number is generated substantially in real-time as the user makes attribute selections. The "My Part Number" field shows the part number code for the wall mount receptacle properly appended to the part number as D38999/20. As part number defining attributes are selected, codependent attributes are made available or unavailable for selection based upon whether the codependent attributes are compatible with the selected part number defining attributes. In a preferred embodiment, the user can select or hover over the part number with pointing device 116 and a pop up window will display descriptions of the selected attributes and any attributes that are inherited from the part series.

Figure 5:
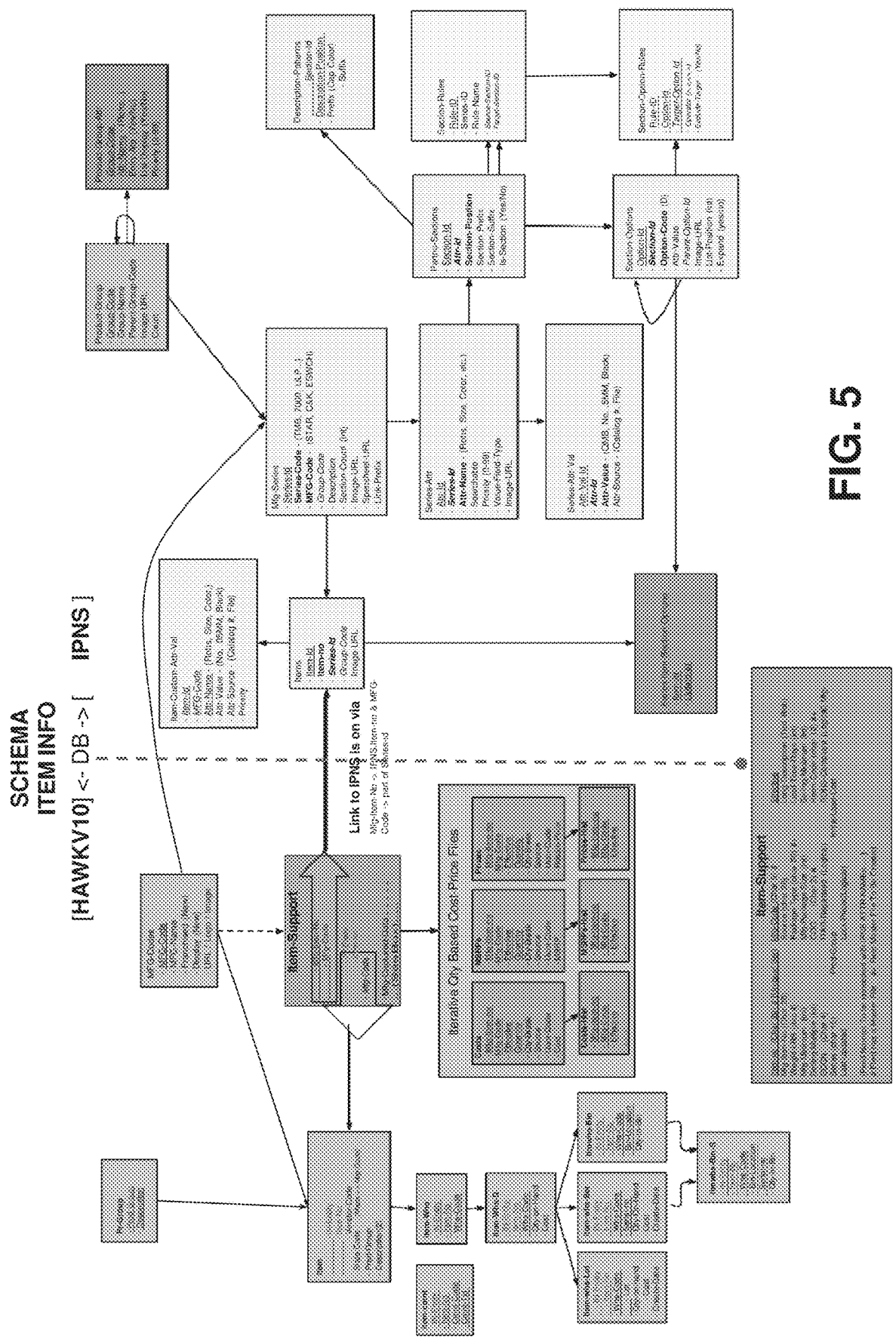
FIG. 5 shows an exemplary intelligent part numbering system database schema in accordance with embodiments of the present invention.

FIG. 5 shows an exemplary intelligent part numbering system database schema in accordance with embodiments of the present invention. The information to the left of the dashed line is a schema of an existing database for tracking items in a warehouse. The information of the right of the dashed line is the schema for the database of the intelligent part numbering system. The intelligent part numbering system can import information available in an existing warehouse inventory database and use that information to dynamically generate part numbers based on selections made by a user. The data file structured on the right side of the dashed line in FIG. 5 is a normalized database design for an intelligent part numbering system in accordance with a preferred embodiment of the present invention. Storing the information that describes a part number in many interrelated tables is a more efficient method. This normalized storage method reduces redundancy of data storage. This method of storing data reduces the ongoing maintenance costs. This method of data storage improves the integrity of information. The complexity of data extraction of attributes surrounding a given part number is increased as compared to a flat file structure, however the benefits are justified. The data file structure on the left side of the dashed line is for reference only and represents a typical ERP system.

Deployment tools include CRUD (CReate, Update, Delete) Maintenance, Series Import/Export Routines, Series Template Generators, Series PN and Metadata Expansion, Product Selector Character based, Product Selector WEB Based Widget/App, Series Stock Status list by attribute combination.

Installing the IPNS Schema linking it to an existing ERP expands the ERP and extended systems (WEB sites and others) to work with series information from the metadata with or without having all unique configurations of a series loaded into the ERP's traditional 1 PN =1 database entry in an "Item" file.

Exemplary code suitable for implementing this system includes the following:

1) General Data Entry Functions: A set of maintenance programs that works with multiple temporary tables storing the metadata that describes a series that uses an intelligent part numbering system (IPNS) to uniquely identify configurable options.

2) Export Function: A function called from the general data entry function that write IPNS metadata about a series generates from a set of temporary tables to a common file format that can be open and used in most spreadsheet applications, such as the .csv file format. When open in a spreadsheet the file has the look and feel of a human readable specification data sheet.

3) Import Function: A function called from the general data entry that reads a .csv or similar file format from a predefined data set format and loads data into a set of temporary tables that define a series metadata.

4) Build IPNS Schema Function: A function called from the general data entry function that builds metadata with generated indexed identifiers to each component of the metadata. This function occurring in a single transaction block to ensure data integrity for the identifying codes.

5) Expand IPNS Items Function: A function called from the general data entry that walks down each available option for each section and create search index records for some or all possible configurations within a series. This code is a recursive script that evaluates multiple heuristics including a logical flag for Expand (Yes/No) for each option, and a predefined set of rules for options that are invalid based on other options.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim as follows:

1. A method of storing and retrieving data related to part numbers in aa computer memory, the method comprising:
   configuring the computer memory according to a database, the database including metadata organized according to a schema including:
   a manufacturer series file for storing information about one or more product series, the manufacturer series file including:
      a series identification field for storing a series identification number for each of the one or more product series;
      a section count field for storing a section count number for each of the one or more product series, the section count number indicating the number attributes associated with the product series identified by the series identification number;
   a series attribute file for storing information about each attribute in product series, the series attribute file being a child file to the manufacturer series file, the series attribute file including:
      an attribute identification field for storing an attribute identification number for each of the attributes associated with the product series;
      an attribute name field for storing a description of the attribute being referenced by the attribute identification number;
   a part number sections file for storing part number section information, the part number sections file being a child file to the series attribute file, the part number sections file including:
      a section identification field for storing a section identification number for each of the part number sections;
      an attribute identification field for storing the attribute identification number associated with each of the section identification numbers;
      a section position field for storing a location of the each of the part number sections with a final part number;
   storing one or more attributes of a part number family in the database according to the metadata schema;
   receiving one or more user inputs, each user input indicating a selection of one of the attributes;
   determining a part number code associated with each of the selected attributes; and
   generating a part number based on the part number codes associated with each of the selected attributes selected by the user.

2. The method of claim 1 in which a part number code is inherited from the part number family.

3. The method of claim 1 in which attributes displayed to a user disappear based on prior selections made by the user.

4. The method of claim 1 in which the generated part number is automatically entered into an enterprise resource planning (ERP) system.

5. The method of claim 4 in which automatically entering the generated part number into the enterprise resource planning (ERP) system causes a part to be manufactured, the part having attributes defined by the generated part number.

6. The method of claim 1 is which generating the part number causes a part to be manufactured, the part having attributes defined by the generated part number.

7. The method of claim 1, further comprising configuring the computer memory according to a database, the database including metadata organized according to a schema including:
   a section options file for storing attribute value options, the section options file being a child file to the part number sections file, the section options file including:
      an option identification field for storing option identification numbers associated with each of the attribute value options;
      an attribute value field for storing attribute values indicating a value associated with each of the attribute value options;
      an option code field for storing option codes, the option codes being associated with each of the attribute value options;
   a series item section options file, the series item section options file being an index file having two long integer fields comprising:
      an item identification field for storing one or more item identification numbers;
      an option identification field for storing the option identification number associated with each item identification number; and wherein the attribute value options of an item are encoded in the option identification number associated with each item identification number.

8. An intelligent part number data storage and retrieval system comprising:
a computer processor; and
a computer memory coupled to the computer processor, the computer memory encoded with computer-readable instructions that, when executed by the computer processor, cause the system to perform any of the steps of :
configuring the computer memory according to a database, the database including metadata organized according to a schema including:
a manufacturer series file for storing information about one or more product series, the manufacturer series file including:
a series identification field for storing a series identification number for each of the one or more product series;
a section count field for storing a section count number for each of the one or more product series, the section count number indicating the number attributes associated with the product series identified by the series identification number;
a series attribute file for storing information about each attribute in product series, the series attribute file being a child file to the manufacturer series file, the series attribute file including:
an attribute identification field for storing an attribute identification number for each of the attributes associated with the product series;
an attribute name field for storing a description of the attribute being referenced by the attribute identification number;
a part number sections file for storing part number section information, the part number sections file being a child file to the series attribute file, the part number sections file including:
a section identification field for storing a section identification number for each of the part number sections;
an attribute identification field for storing the attribute identification number associated with each of the section identification numbers;
a section position field for storing a location of the each of the part number sections within a final part number;
storing one or more attributes of a part number family in database according to the metadata schema;
receiving one or more user inputs, each user input indicating a selection of one of the attributes;
determining a part number code associated with each of the selected attributes; and
generating a part number based on the part number codes associated with each of the selected attributes.

9. The system of claim 8 in which a part number code is inherited from the part number family.

10. The system of claim 8 in which attributes displayed to a user disappear based on prior selections made by the user.

11. The system of claim 8 in which the generated part number is automatically entered into an enterprise resource planning (ERP) system.

12. The system of claim 11 in which automatically entering the generated part number into the enterprise resource planning (ERP) system causes a part to be manufactured, the part having attributes defined by the generated part number.

13. The system of claim 8 is which generating the part number causes a part to be manufactured, the part having attributes defined by the generated part number.

14. The data storage and retrieval system of claim 8, further comprising configuring the computer memory according to a database, the database including metadata organized according to a schema including:
a section options file for storing attribute value options, the section options file being a child file to the part number sections file, the section options file including:
an option identification field for storing option identification numbers associated with each of the attribute value options;
an attribute value field for storing attribute values indicating a value associated with each of the attribute value options;
an option code field for storing option codes, the option codes being associated with each of the attribute value options;
a series item section options file, the series item section options file being an index file having two long integer fields comprising:
an item identification field for storing one or more item identification numbers;
an option identification field for storing the option identification number associated with each item identification number; and
wherein the attribute value options of an item are encoded in the option identification number associated with each item identification number.

15. A non-transitory, computer-readable medium encoded with computer-readable instructions for an intelligent part numbering system that, when executed by one or more computer processors of a data storage and retrieval system, cause the data storage and retrieval system to perform the steps of:
configuring the computer memory according to a database, the database including metadata organized according to a schema including:
a manufacturer series file for storing information about one or more product series, the manufacturer series file including:
a series identification field for storing a series identification number for each of the one or more product series;
a section count field for storing a section count number for each of the one or more product series, the section count number indicating the number attributes associated with the product series identified by the series identification number;
a series attribute file for storing information about each attribute in product series, the series attribute file being a child file to the manufacturer series file, the series attribute file including:
an attribute identification field for storing an attribute identification number for each of the attributes associated with the product series;
an attribute name field for storing a description of the attribute being referenced by the attribute identification number;
a part number sections file for storing part number section information, the part number sections file being a child file to the series attribute file, the part number sections file including:

a section identification field for storing a section identification number for each of the part number sections;

an attribute identification field for storing the attribute identification number associated with each of the section identification numbers;

a section position field for storing a location of the each of the part number section within a final part number;

storing one or more attributes of a part family in the database according to the metadata schema;

receiving one or more user inputs, each user input indicating a selection of one of the attributes;

determining a part number code associated with each of the selected attributes; and generating a part number based on the part number codes associated with each of the selected attributes.

16. The non-transitory, computer-readable medium of claim 15 in which a part number code is inherited from the part number family.

17. The non-transitory, computer-readable medium of claim 15 in which attributes displayed to a user disappear based on prior selections made by the user.

18. The non-transitory, computer-readable medium of claim 15 in which the generated part number is automatically entered into an enterprise resource planning (ERP) system.

19. The non-transitory, computer-readable medium of claim 18 in which automatically entering the generated part number into the enterprise resource planning (ERP) system causes a part to be manufactured, the part having attributes defined by the generated part number.

20. The non-transitory, computer-readable medium of claim 15 is which generating the part number causes a part to be manufactured, the part having attributes defined by the generated part number.

21. The non-transitory, computer-readable medium of claim 15 further comprising configuring the computer memory according to a database, the database including metadata organized according to a schema including:

a section options file for storing attribute value options, the section options file being a child file to the part number sections file, the section options file including:

an option identification field for storing option identification numbers associated with each of the attribute value options;

an attribute value field for storing attribute values indicating a value associated with each of the attribute value options;

an option code field for storing option codes, the option codes being associated with each of the attribute value options;

a series item section options file, the series item section options file being an index file having two long integer fields comprising:

an item identification field for storing one or more item identification numbers;

an option identification field for storing the option identification number associated with each item identification number; and wherein the attribute value options of an item are encoded in the option identification number associated with each item identification number.

* * * * *